(12) United States Patent
Philips et al.

(10) Patent No.: US 6,210,470 B1
(45) Date of Patent: Apr. 3, 2001

(54) ULTRASONIC GAS SEPARATOR

(75) Inventors: Richard B. Philips, Barrington; Robert Kuklinski, Portsmouth, both of RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 08/282,847

(22) Filed: Jul. 28, 1994

(51) Int. Cl.[7] .................................................. B01D 19/00
(52) U.S. Cl. .................................. 96/175; 95/30; 96/389
(58) Field of Search ........................ 96/175, 389; 95/29, 95/30; 55/277

(56) References Cited

U.S. PATENT DOCUMENTS

| | | | |
|---|---|---|---|
| 2,363,247 | * 11/1944 | Holder | 95/30 X |
| 2,376,221 | * 5/1945 | Baker | 95/30 |
| 3,109,721 | * 11/1963 | Zenner et al. | 55/277 X |
| 3,266,631 | * 8/1966 | Snaper | 55/277 X |
| 3,325,976 | * 6/1967 | West | 55/277 X |
| 3,429,743 | * 2/1969 | Branson | 55/277 X |
| 3,904,392 | * 9/1975 | VanIngen et al. | 55/277 X |
| 4,070,167 | * 1/1978 | Barbee et al. | 55/277 X |
| 4,339,247 | * 7/1982 | Faulkner et al. | 55/277 X |
| 5,022,899 | * 6/1991 | Hohlfeld et al. | 55/277 X |
| 5,085,783 | * 2/1992 | Feke et al. | 55/277 X |

FOREIGN PATENT DOCUMENTS

| 1708384 | * 1/1992 | (SU) | 96/175 |
|---|---|---|---|
| 9209354 | * 6/1992 | (WO) | 55/277 |

OTHER PUBLICATIONS

* References Checked Were Cited in Specification.*
* cited by examiner

*Primary Examiner*—Richard L. Chiesa
(74) *Attorney, Agent, or Firm*—Michael J. McGowan; James M. Kasischke; Prithvi C. Lall

(57) ABSTRACT

Gas bubbles in a moving fluid are collected in a chamber alongside the conduit carrying the fluid. In a preferred embodiment, an ultrasonic transducer cooperates with a reflector to create a standing ultrasonic wave pattern that is oriented at an acute angle to the horizontal axis of fluid flow. Bubbles gather at the troughs between the waves and then move between the pressure waves in the downstream direction to be collected in the chamber. Buoyant forces aid the movement of the bubbles in an upward direction. A gas permeable window at the top of the chamber allows removal of the collected bubbles.

10 Claims, 1 Drawing Sheet

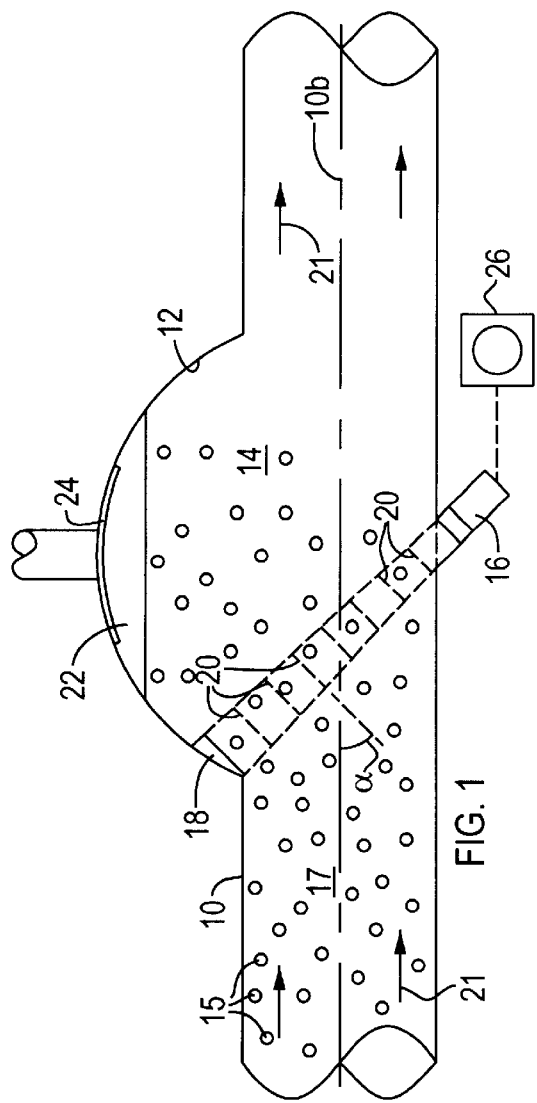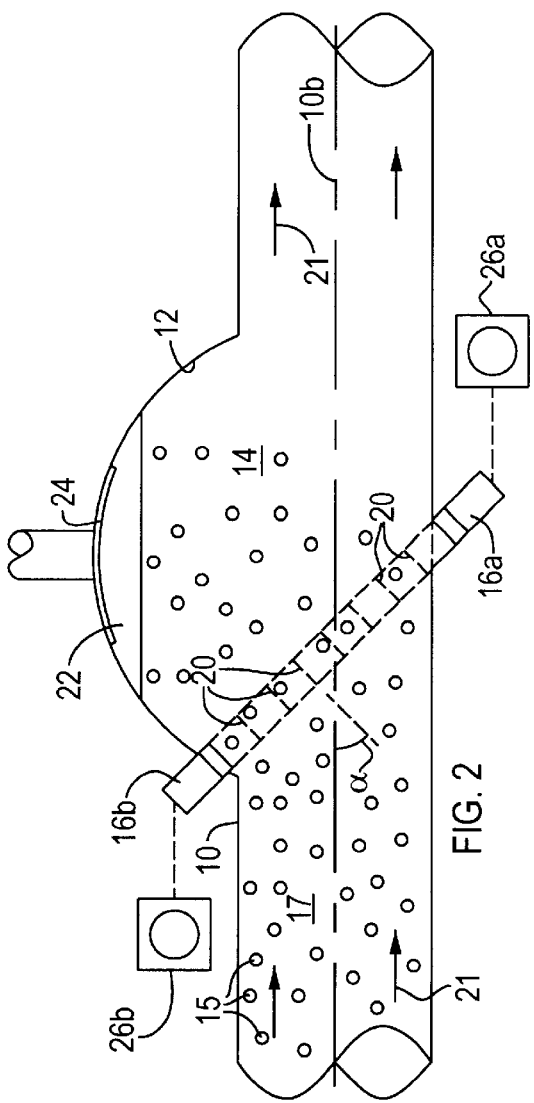

ULTRASONIC GAS SEPARATOR

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention relates to separating gas bubbles from a liquid stream, and deals more specifically with creating standing ultrasonic waves in a conduit and associated chamber such that the gas bubbles in the liquid stream will have a component of velocity in the direction of a bubble permeable window in the chamber, through which window accumulated gas can be withdrawn.

(2) Description of the Prior Art

The use of acoustic energy to debubble a liquid is well known in the prior art. In the prior art a transducer provides acoustic energy to the liquid causing small bubbles to merge and form larger bubbles. Because the larger bubbles have a greater buoyancy, they float to the top of a chamber where they can be collected.

The use of sonic energy to debubble a liquid is known from U.S. Pat. No. 3,429,743 issued to Branson in 1969. This principle has been applied to the removal of bubbles from a closed container having a quantity of liquid therein as shown in Branson, and in U.S. Pat. No. 3,904,392 issued to VanIngen et al., and also in U.S. Pat. No. 4,070,167 issued to Barbee et al.

Hohlfield et al., U.S. Pat. No. 5,022,899, discloses a sonic debubbler for use with a moving liquid. Anisotropic sound waves are directed through the fluid perpendicular to its flow. The pressure of the sound waves moves the bubbles away from the liquid outlet of the device. Hohlfield teaches that a non-reflective surface must be provided opposite the ultrasonic transducer so that the sound waves continuously travel from the transducer to be absorbed by this non-reflective surface. Thus, Hohlfield teaches traveling waves to move the bubbles.

Other patents such as Feke et al., U.S. Pat. No. 5,085,783 teach the use of a standing acoustic wave to remove particles from a liquid; however these patents do not teach a method for debubbling a liquid flowing through a conduit where space is limited.

SUMMARY OF THE INVENTION

The general purpose of the present invention is to utilize ultrasonic energy to create standing waves in a chamber defined in part by the conduit through which the moving fluid flows, and also in part by the chamber defined to one side of the conduit so as to orient the standing waves at an angle to the direction of fluid flow in the conduit. This geometry provides a component of velocity for the gas bubbles directing the bubbles toward a permeable window or other vent through which gas can be conveniently withdrawn from the chamber.

It is a further object of the present invention to provide a readily replaceable conduit segment with features in accordance with the present invention that can be conveniently installed in an existing pipe or other plumbing arrangement for purposes of withdrawing gas bubbles from a fluid flowing through such plumbing arrangement or pipe.

Another purpose of the present invention is to provide an ultrasonic gas separator which leaves the fluid flow relatively undisturbed by the bubble separation process.

Still another object of the present invention is to provide an ultrasonic gas separator for liquid flowing through a conduit which separator occupies only a minimum of space, and which will require much less energy than prior art centrifugal separators and the like.

A still further object of the present invention is to provide an ultrasonic gas separator that can be used with caustic and corrosive fluids.

These objects are accomplished with the present invention by providing a first conduit segment for constraining the fluid to flow in a first direction, and providing wall means cooperating with a portion of the conduit so as to define a chamber on at least one side of the conduit and alongside the normal direction of fluid flow. The chamber is in communication with the interior of the conduit, and the conduit has another side opposite the one associated with the chamber that provides for the mounting of an ultrasonic generating means preferably in the form of an ultrasonic transducer. The chamber wall means includes a sound reflecting portion oriented at an acute angle with respect to the axis of the conduit and provided in line with the ultrasonic transducer, to reflect the sound waves back toward the transducer and thereby create standing waves within a predetermined region of the conduit interior and the chamber. As a result of this construction gas bubbles entrained in the fluid and moving in the direction of the conduit will tend to gather between the standing pressure waves generated by the ultrasonic transducer, and as a result of the angle of these waves with respect to the axis of the conduit the gas bubbles have a component of velocity into the chamber and are thereby directed toward a vent or permeable window through which the gas can escape or be periodically withdrawn.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawing wherein we have shown an ultrasonic gas separator in accordance with the present invention.

FIG. 1 shows schematically a gas bubble separator constructed in accordance with the present invention; and FIG. 2 shows schematically a gas bubble separator constructed in accordance with an alternative embodiment of the present invention.

DESCRIPTION OF THE PREFERRED EMBODIMENT

Referring now to the drawings in greater detail, FIG. 1 shows a conduit 10 provided with wall means 12 defining a chamber 14 adjacent to the conduit interior. A multiplicity of bubbles 15 are shown entrained in a fluid 17 flowing through the conduit 10. An ultrasonic transducer 16 is provided in one side of the conduit 10. The transducer 16 is directed at an angle to the horizontal axis 10b of the conduit to create acoustic standing waves 20 in fluid 17 between the transducer 16 and a reflective surface 18 provided in the wall means 12. These standing waves 20 are preferably emitted at an acute angle with respect to the horizontal axis 10b of the conduit. The angle is preferably in the range of 30°–60°. The ultrasonic generating means in the form of a transducer 16 and the reflecting surface 18 are provided for creating these standing waves. These pressure waves have a particular angular relationship as shown so that the fluid 17 flowing in the direction of the arrows 21, from left to right as indicated in the FIG. 1, will cause the bubbles 15 to have a component of motion between the standing waves 20 generally upwardly in the drawing and into the chamber 14 defined by the wall means 12. Therefore, these bubbles 15 will accumulate in an upper portion 22 of this chamber 14. Bouyant forces maintain accumulated gas in upper portion 22. A gas permeable window 24 is provided as shown to allow the gases in the portion 22 to escape. The window 24 can be open permanently to vent these gases or can be periodically opened.

The above described ultrasonic gas separator utilizes the mismatch in acoustic impedance across gas bubbles in a stationary ultrasonic wave pattern 20 created in the path of the moving liquid 17. Each gas bubble 15 as it travels in a generally downstream direction is urged upwardly between the pressure waves. A net force is imparted to the bubbles 15 as a result of this non-linear action between the gas bubble 15 and the standing acoustic waves 20. The relative magnitude of this force varies with the relative size of the vapor bubble and the wavelength of the acoustic wave. In order to trap small bubbles waves of relatively high frequency must be used. Depending upon the size bubbles to be removed from a particular liquid, suitable control means 26 can be provided to alter the frequency of the ultrasonic transducer 16 as required.

Thus, the transducer 16 is driven by a variable control means and activation of the control means 26 causes a standing wave field to be formed as shown. The frequency and wave length of the ultrasonic transmissions can be varied to optimize the effect on bubbles of a given size. It is possible to sweep through a range of frequencies in order to optimize the installation, and to remove bubbles over a range of different sizes.

In an alternative embodiment, shown in FIG. 2, an ultrasonic gas separator of the current invention is shown as implemented with two transducers 16a and 16b. In FIG. 2. inventive elements having the same name as those in FIG. 1 are identified with the same number. Each transducer 16a and 16b is electrically connected to a corresponding control means 26a and 26b. Although two control means 26a and 26b are shown in FIG. 2, it is understood that a single control means can be connected to both transducers 16a and 16b. Transducers 16a and 16b generate a plurality of standing waves 20 at an angle to fluid flow 21. Standing waves 20 urge gas bubbles 15 upward and out of the fluid flow region. Control means 26a and 26b allow the number of standing waves 20 to be adjusted to separate gas bubbles 15 having various sizes from fluid 17.

The ultrasonic gas separator may be used in a number of applications where limited space or a caustic liquid is being handled. In the case of a caustic liquid a modified version or separator can be constructed and mounted outside an existing pumping system. By mounting the ultrasonic transducers and reflectors outside of a pipe or conduit, and providing suitable windows for them, no physical contact with the caustic liquid would be necessary. Such an arrangement might be particularly useful in the nuclear or chemical processing or waste management industries.

In light of the above, it is therefore understood that within the scope of the appended claims, the invention may be practiced otherwise than as specifically described.

What is claimed is:

1. Apparatus for separating gas bubbles from a moving fluid comprising:

a conduit for constraining the fluid to flow in a first direction;

wall means cooperating with said conduit to define a chamber on at least one side of said conduit and located alongside the fluid flowing in said first direction, said chamber being in communication with the interior of said conduit, said conduit having another side opposite said one side;

an ultrasonic generating means provided in part in said wall means and in part in said another side of said conduit, said generating means being oriented to create standing ultrasonic waves in said conduit, said standing ultrasonic waves having planar node and antinode regions oriented at an angle to the flow of said fluid; and a bubble permeable window in said wall means to withdraw bubbles reaching said window.

2. The apparatus according to claim 1 wherein said ultrasonic generating means comprises a transducer and a reflector oriented in a direction such that the standing waves are oriented at an acute angle to said first direction of fluid flow.

3. The apparatus according to claim 2 further comprising a variable driver for said ultrasonic transducer.

4. The apparatus according to claim 3 wherein said variable driver provides for varying both the frequency and wavelength of the ultrasonic sound waves.

5. The apparatus according to claim 1 wherein said wall means and said bubble permeable window are provided on the top side of said conduit, said conduit oriented generally horizontally.

6. The apparatus according to claim 1 wherein said angle is in the range of 30°–60°.

7. The apparatus according to claim 1 wherein said ultrasonic generating means comprises:

a first transducer for generating acoustic waves; and a second transducer for generating complimentary acoustic waves positioned opposite said first transducer whereby standing waves are generated at an angle to said liquid flow.

8. The apparatus according to claim 7 further comprising:

a first variable driver joined to said first transducer; and a second variable driver joined to said second transducer.

9. The apparatus according to claim 8 wherein said first variable driver and said second variable driver provide for varying both the frequency and wavelength of the ultrasonic sound waves.

10. The apparatus according to claim 7 wherein said wall means and said bubble permeable window are provided on the top side of said conduit, said conduit oriented generally horizontally.

* * * * *